United States Patent [19]

Yoshida

[11] 4,318,080
[45] Mar. 2, 1982

[54] DATA PROCESSING SYSTEM UTILIZING ANALOG MEMORIES HAVING DIFFERENT DATA PROCESSING CHARACTERISTICS

[75] Inventor: Hajime Yoshida, Tokyo, Japan

[73] Assignee: Hajime Industries, Ltd., Tokyo, Japan

[21] Appl. No.: 74,539

[22] Filed: Sep. 11, 1979

Related U.S. Application Data

[63] Continuation of Ser. No. 860,207, Dec. 13, 1977, abandoned.

[30] Foreign Application Priority Data

Dec. 16, 1976 [JP] Japan .............................. 51/151060

[51] Int. Cl.³ .............................................. G06K 9/00
[52] U.S. Cl. ......................... 340/146.3 Q; 179/1 SA; 340/347 AD; 340/347 M; 364/724; 364/825
[58] Field of Search ................ 179/1 SA; 340/347 M, 340/347 AD, 347 DA, 347 SH, 146.3 MA, 146.3 Q; 307/221 C, 221 D; 364/724, 825

[56] References Cited

U.S. PATENT DOCUMENTS

| | | | |
|---|---|---|---|
| 3,037,077 | 5/1962 | Williams et al. | 340/347 M X |
| 3,222,670 | 12/1965 | Harel | 340/347 SH |
| 3,471,644 | 10/1969 | Gold et al. | 179/1 SA X |
| 3,534,332 | 10/1970 | Parks | 340/146.3 Q |
| 3,820,112 | 6/1974 | Roth | 340/347 SH X |
| 3,849,760 | 11/1974 | Endou et al. | 340/146.3 H |
| 3,868,516 | 2/1975 | Buss | 307/221 C X |
| 3,942,034 | 3/1976 | Buss | 307/221 D |
| 3,974,334 | 8/1976 | Cockerell | 179/1 SA |
| 4,047,152 | 9/1977 | Giuliano et al. | 340/146.3 MA X |
| 4,158,751 | 6/1979 | Bode | 179/1 SA |

OTHER PUBLICATIONS

The Engineering Staff of Analog Devices, Inc., Analog-Digital Conversion Handbook, 6/72, pp. I-6 & I-7; I-26 through I-31; III-78 through III-81.

Hoeschele, Analog-to-Digital/Digital-to-Analog Conversion Techniques, 8/68, pp. 416 and 417, J. Wiley and Sons, Inc.

Cook et al., Radar Signals, Academic Press, 1967, pp. 254-265.

Calkins et al., Data Acquisition in a Dip Shrinks Systems, Electronics, Jul. 8, 1976, pp. 77-83.

*Primary Examiner*—Thomas J. Sloyan
*Attorney, Agent, or Firm*—Hill, Van Santen, Steadman, Chiara & Simpson

[57] ABSTRACT

A data processing system is disclosed in which analog input information or data is fed to a plurality of analog memories each of which receives different input information and has different data processing characteristics and in which discrete analog signal values from the analog memories are converted into digital information.

4 Claims, 5 Drawing Figures

DATA PROCESSING SYSTEM UTILIZING ANALOG MEMORIES HAVING DIFFERENT DATA PROCESSING CHARACTERISTICS

This is a continuation of application Ser. No. 860,207 filed Dec. 13, 1977, now abandoned.

BACKGROUND OF THE INVENTION

1. Field of the Invention

This invention relates generally to a data processing system, and is directed more specially to a data processing system in which analog memories are used.

2. Description of the Prior Art

Conventionally, as an example in processing pattern information or data, if the pattern data comprises photo image pattern data, such photo image pattern data is converted into electrical signal and the electrical signal is converted to digital electrical signals with the use of an analog to digital converter. The digital signals are stored in a digital memory, and the many digital data signals in such memories are processed to reproduce the original patterns. Accordingly, complex data processing circuitry is necessary to practice such convertional methods, and a drawback of such systems is that a long time is required to process the data.

OBJECT AND SUMMARY OF THE INVENTION

Therefore, a main purpose of this invention is to provide a data processing system which eliminates the such above mentioned drawbacks of the conventional prior art systems.

A further purpose of this invention is to provide an improved data processing system for use in pattern recognition.

Generally, the methods of pattern recognition used are, depending upon the recognition means are that the pattern data of a predetermined standard pattern is generated and stored, and then input data is compared with the stored data to determine the similarities. If the stored standard analog pattern data is fully converted into digital data which is to be stored, the size of the memory must be very large, so normally, only the features of the standard pattern data are extracted and placed in the memory.

According to an aspect of the present invention, there is provided a data processing system that can be advantageously used for pattern recognition purposes as an example, in which an analog input signal to be processed is supplied to a plurality of analog memories, and the input data processing characteristics of each of the plurality of analog memories are selected to be different from each other, and the discrete analog values from each of the analog memories are converted into digital data.

The other objects, features and advantages of the present invention will become apparent from the following description taken in conjunction with the accompanying drawings.

DESCRIPTION OF THE PREFERRED EMBODIMENT

An example of this invention is explained with reference to the drawings.

Figure 1:
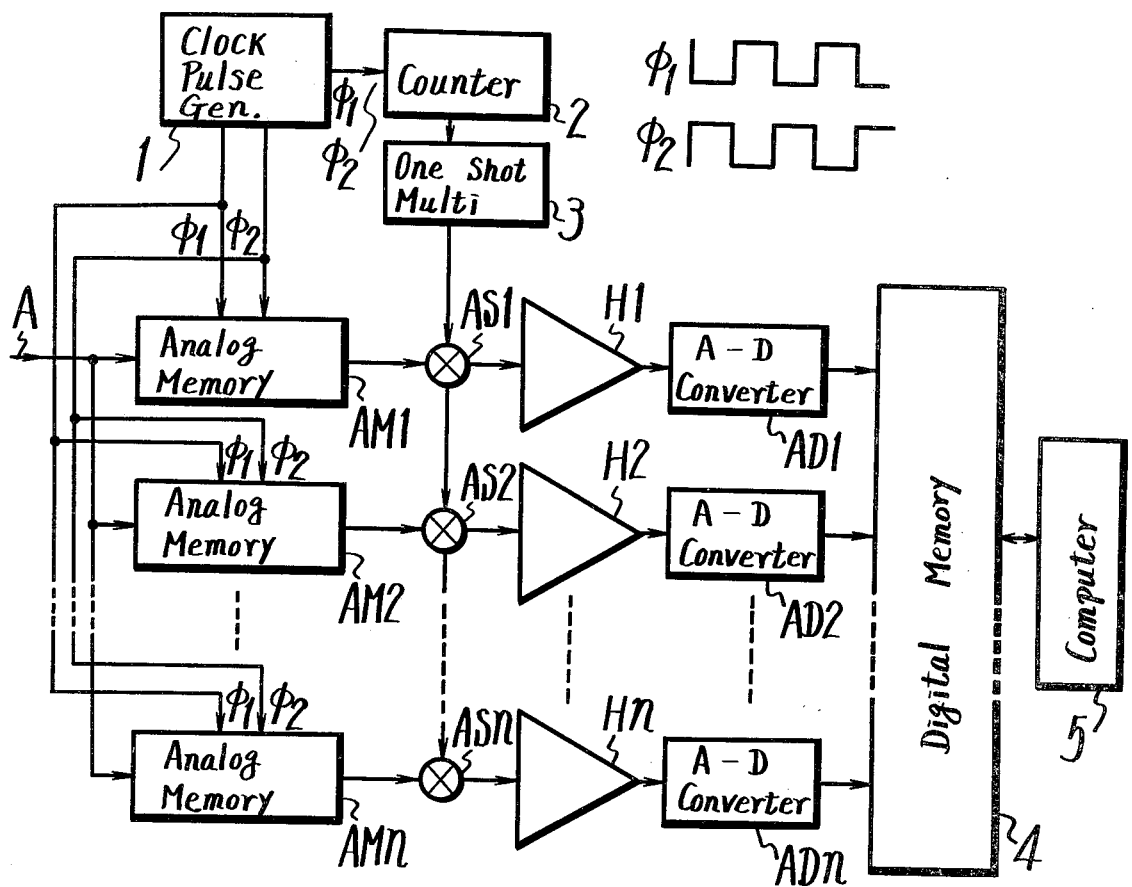
FIG. 1 illustrates a schematic block diagram showing an example of the data processing system of this invention.
Figure 2:
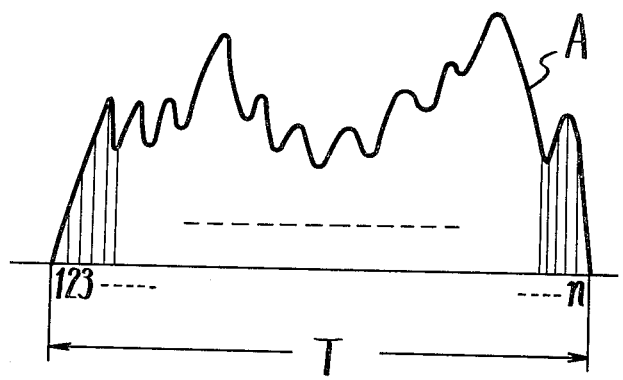
FIG. 2 is a waveform diagram which shows an input data.

FIG. 1 illustrates a systematic block diagram of an example of the data processing system according to this invention, wherein item 1 is a clock pulse generator which generates alternating clock pulse $\phi 1$ and $\phi 2$ with reversed phase. AM1, AM2 . . . AMn are analog memories to which analog input data A that is to be processed, is simultaneously supplied. At the same time reversed phase clock pulses $\phi 1$ and $\phi 2$ that are generated by clock pulse generator 1, are supplied from generator 1. Either of the clock pulses $\phi 1$ or $\phi 2$ generated by clock pulse generator 1 in alternating phase, is supplied to counter 2 and a sampling time T for the input analog data A is produced, as illustrated on FIG. 2. In other words, counter 2 counts the clock pulses that correspond to the sampling period and then produces an output which is supplied to the one shot multi-vibrator 3. Then, the one shot multi-vibrator 3 produces an output which is supplied to control the closing and opening of each of the analog switches AS1 . . . ASn, to which the output of each of the analog memories AM1 . . . AMn, are respectively supplied.

The output from each of the analog switches AS1 . . . ASn is respectively supplied to the hold circuits H1 . . . Hn which hold the outputs of the analog memories. The outputs of hold circuits H1–Hn are converted into digital signals in the analog digital converters AD1 . . . ADn, which receive their outputs. A digital memory 4 receives and stores the outputs of converters AD1-ADn.

Further, in this invention, the analog switches AS1 . . . ASn and hold circuits H1 . . . Hn comprise sample hold circuits.

The analog memories AM1 . . . AMn will be further explained with reference to FIGS. 3 and 4. It should be noted that the characteristics as illustrated in FIG. 4 of the analog memories AM1 . . . AMn are determined by the resistors R1–Rn and the differences in the resistance values of the resistors R1–Rn for each memory determine the individual characteristics and explanations will be focussed on analog memory AM1 as an example.

Figure 3:
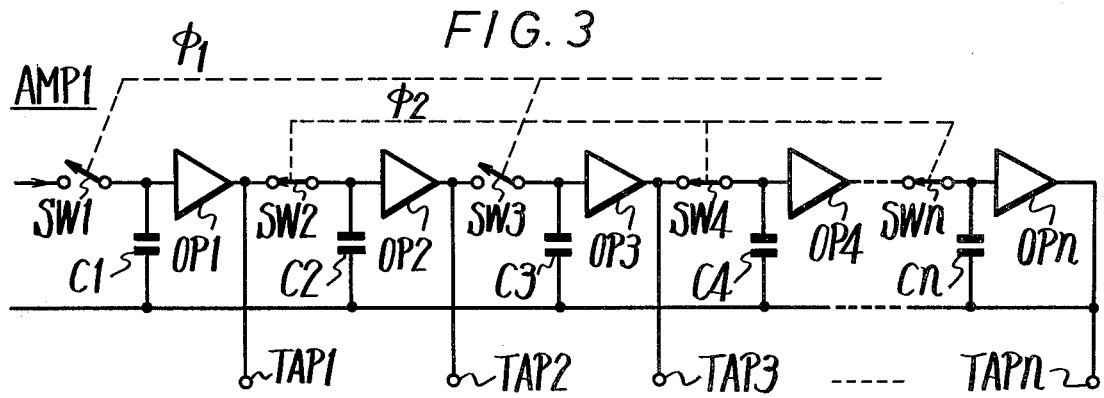
FIG. 3 is a detail connection diagram of a part of the system shown in FIG. 4.
Figure 4:
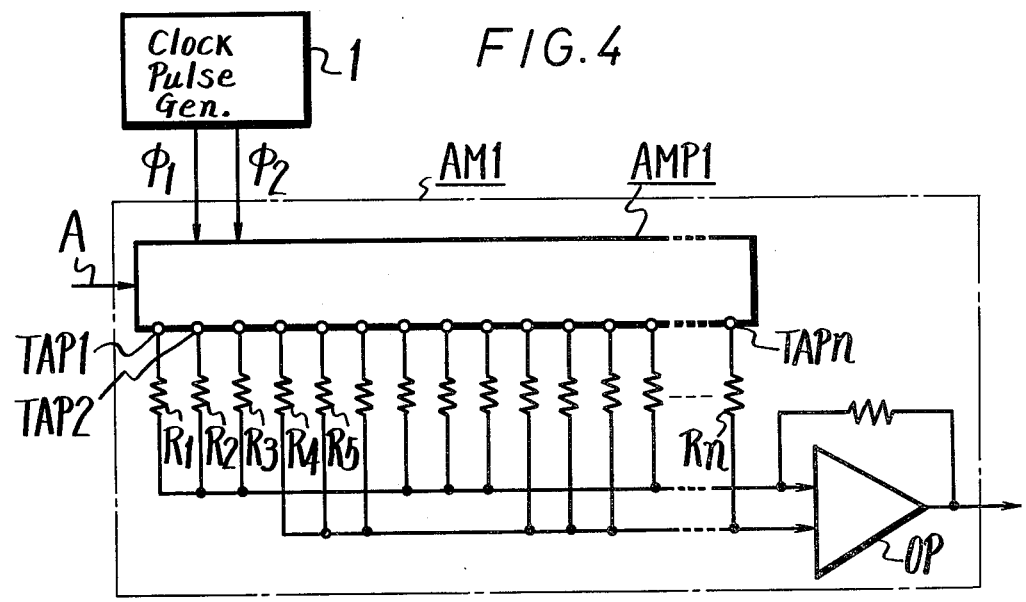
FIG. 4 is a detail connection diagram in part of the example shown in FIG. 1.

As shown in FIG. 3, the main body AMP1 of the analog memory AM1 contains n operational amplifiers OP1, OP2 . . . OPn which are connected in series or cascade through switches SW1, SW2 . . . SWn as shown. Memory elements such as capacitors C1, C2 . . . Cn are connected to the amplifiers OP1, OP2 . . . OPn as shown. In this case, for instance, one of the clock pulse from the clock pulse generator 1, such as $\phi 1$ is simultaneously supplied to the odd numbered switches SW1, SW3 . . . , while the other clock pulse $\phi 2$ is supplied to the even numbered switches SW2, SW4 . . . From the output side of each operational amplifier OP1 . . . OPn leads are provided to taps TAP1, TAP2 . . . TAPn, respectively.

Figure 5:
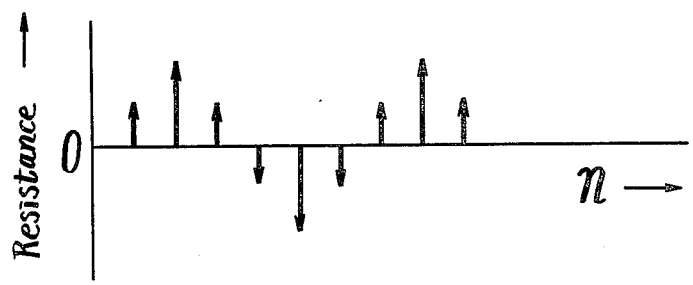
FIG. 5 is a diagram used to explain the circuit shown in FIG. 4.

As shown on FIG. 4, resistors R1, R2 . . . Rn are individually connected to taps TAP1 . . . TAPn. Groups are formed, for instance, with 3 resistors each such as R1~R3, R4~R6, . . . per group, by connecting the ends away from taps TAP1 . . . N of the resistors together, and then the groups are alternatively connected in common to 2 input terminals of an operational amplifier OP. It is noted in this case that the resistance values of the resistors R1 . . . Rn which are connected to TAP1 . . . TAPn respectively, are selected to provide different weights as shown at FIG. 5. Further, the resistance value weight scale in FIG. 5 is related only to the analog memory AM1, while the corresponding resistance values of the resistors to each memory are arranged with different weights relative to each other so that the data processing characteristics of each analog memory AM1 . . . AMn different from each other.

One example of the operation of this invention will be explained. If the input analog data A that is to be processed is simultaneously supplied to each of the analog memories AM1 . . . AMn while the alternating clock pulses $\phi 1$ and $\phi 2$ which are reverse phased from the clock pulse generator 1 are also supplied to each of analog memories AM1 . . . AMn, as illustrated in FIG. 3 (this example shows only analog memory AM1), the odd number switches SW1, SW3 . . . and the even number switches SW2, SW4 . . . are alternately opened and closed so that the analog input data stored in capacitors C1 . . . Cn are shifted from the first operational amplifer to the later operational amplifier in sequence and hence the analog input data appears at each of the taps TAP1 . . . TAPn. The analog data obtained at each of the taps TAP1 . . . TAPn are formed in groups through the varied valued resistors which are alternatively supplied in sequence to the input terminal of operational amplifier OP. Accordingly, this operational amplifier OP produces a discrete characterized output for analog memory AM1. Although not illustrated in the drawings the other operational amplifiers OP of the other analog memories AM2 . . . AMn also produce outputs with discrete characteristics. Such outputs from the analog memories AM1 . . . AMn are equally held after being sampled during the sampling period T by the sampling hold circuits, which are formed by the analog switches AS1 . . . ASn which are controlled by the one shot multivibrator 3 and the hold circuits H1 . . . Hn.

The output analog data is converted into digital data by each of the analog digital convertors AD1 . . . ADn and the digital data are stored in digital memory 4.

With this invention, the input analog data, is processed in the front stages of the analog digital convertor, as described above, which allows the circuitry for data processing to be simplified in comparison to the conventional data processing systems, and a low cost installation results possible, and also, the data processing is accomplished within a very short period of time.

Further, the data which is processed by the data processing system of this invention as explained above can be thereafter processed for instance, for pattern recognition purposes, using conventional technology, with the use of a computer 5 (refer to FIG. 1).

A single preferred example of the invention is shown and described, as above, but it will be apparent that many modifications and variations could be effected by one skilled in the art without departing from the spirits or scope of the novel concepts of the present invention, so that the scope of the invention should be determined by the appended claims.

I claim as my invention:

1. A data processing system in which pattern data of a predetermined standard pattern is memorized and an unknown input data is compared with the memorized pattern data to determine whether or not the unknown input data resembles the memorized pattern data comprising:

clock pulse generator means for producing two phase clock pulses;

a plurality of analog memory means each having different transfer characteristics, an input analog signal to be sampled and processed during a sampling period being applied simultaneously to each of said analog memory means and said two phase clock pulses from said clock pulse generator means being applied simultaneously to each of said memory means so that each of said memory means produces a single output representing said input analog signal during the sampling period;

a plurality of analog switching means equal in number to the number of said analog memory means which receive the outputs of said analog memory means, respectively;

a plurality of sampling hold means equal in number to the number of said analog memory means which receive output analog signals from said plurality of analog memory means through said plurality of switching means, respectively;

a control means supplied with said two phase clock pulses from said clock pulse generator and producing a control signal which occurs at the end of the sampling period which is applied commonly to said plurality of analog switching means to close said analog switching means simultaneously;

a plurality of analog-digital converter means equal in number to the number of said analog memory means which receive the analog output signals from said plurality of sampling hold means and convert said analog output signals into digital signals;

a digital memory receiving said digital signals from said plurality of analog-digital converter means;

a computer receiving the output of said digital memory; and wherein each of said analog memory means consists of a plurality of operational amplifiers, a second of plurality of switches, said plurality of operational amplifiers and second plurality of switches being alternately connected in cascade, a plurality of memory means each connected between adjacent ones of said second plurality of switches and said operational amplifiers, a plurality of taps connected to output terminals of said plurality of operational amplifiers, a plurality of resistors of different ohmic values connected to said plurality of taps, respectively, and a further operational amplifier with its input terminals connected to said resistors.

2. A data processing system as claimed in claim 1, wherein each of said analog memory means includes a capacitor.

3. A data processing system as claimed in claim 4, wherein said control means consists of a counter supplied with said two phase clock pulses from said clock pulse generator means and an one shot multivibrator supplied with an output from said counter, an output of said one shot multivibrator being applied to said analog switches to control their conduction and non-conduction.

4. A data processing system as claimed in claim 4, wherein the resistance values of said resistors connected to said plurality of taps of each of said analog memory means are different from each other so as to produce data processing characteristics of said analog memory which are different from each other.

* * * * *